(12) United States Patent
Yaksich

(10) Patent No.: US 9,364,901 B2
(45) Date of Patent: *Jun. 14, 2016

(54) SELF TIGHTENING CHUCK WITH AN AXIAL LOCK

(71) Applicant: Apex Brands, Inc., Sparks, MD (US)

(72) Inventor: Theodore G. Yaksich, Seneca, SC (US)

(73) Assignee: Apex Brands, Inc., Sparks, MD (US)

( * ) Notice: Subject to any disclaimer, the term of this patent is extended or adjusted under 35 U.S.C. 154(b) by 557 days.

This patent is subject to a terminal disclaimer.

(21) Appl. No.: 13/849,660

(22) Filed: Mar. 25, 2013

(65) Prior Publication Data

US 2013/0207353 A1 Aug. 15, 2013

Related U.S. Application Data

(63) Continuation of application No. 12/486,684, filed on Jun. 17, 2009, now Pat. No. 8,403,339.

(60) Provisional application No. 61/073,419, filed on Jun. 18, 2008.

(51) Int. Cl.
*B23B 31/16* (2006.01)
*B23B 31/12* (2006.01)

(52) U.S. Cl.
CPC .............. *B23B 31/16* (2013.01); *B23B 31/123* (2013.01); *B23B 31/1253* (2013.01); *Y10T 279/17615* (2015.01); *Y10T 279/17632* (2015.01); *Y10T 279/32* (2015.01); *Y10T 408/953* (2015.01)

(58) Field of Classification Search
CPC .............. Y10T 279/17649; Y10T 279/17623; Y10T 279/17615; Y10T 279/17658; Y10T 408/953; B23B 31/123

USPC .......................................................... 408/240
See application file for complete search history.

(56) References Cited

U.S. PATENT DOCUMENTS

| 573,189 A | 12/1896 | Vogel |
| 1,372,577 A | 3/1921 | Wallenberg |

(Continued)

FOREIGN PATENT DOCUMENTS

| DE | 2847927 | 5/1980 |
| DE | 3406668 | 9/1985 |

(Continued)

OTHER PUBLICATIONS

UK Patent Office Search Report dated Aug. 19, 2009.

(Continued)

*Primary Examiner* — Daniel Howell
(74) *Attorney, Agent, or Firm* — Nelson Mullins Riley & Scarborough, LLP

(57) ABSTRACT

A chuck with a generally cylindrical body having a tail section configured to receive a drive shaft of a driver and a nose section having an axial bore formed therein. A plurality of jaws is movably disposed with respect to the body. A threaded spindle is rotatably connected to the body and operatively engages the jaws. A first ring is fixedly mounted about the body and has a first plurality of teeth. An inner sleeve is rotatably mounted about the tail section and has an open portion. A second ring that has at least one protrusion that mates with the corresponding open portion and extends outwardly from the inner sleeve and the ring has a second plurality of teeth. An outer sleeve is placed concentrically around the inner sleeve and contains a lock groove that the protrusion of the second ring is situated inside the lock groove.

19 Claims, 12 Drawing Sheets

(56) References Cited

U.S. PATENT DOCUMENTS

| | | |
|---|---|---|
| 1,907,553 A | 5/1933 | Lundin |
| 2,684,856 A | 7/1954 | Stoner |
| 3,737,170 A | 6/1973 | Wanner et al. |
| 3,970,323 A | 7/1976 | Schnizler, Jr. |
| 4,213,623 A | 7/1980 | Rohm |
| 4,272,087 A | 6/1981 | Rohm |
| 4,302,021 A | 11/1981 | Rohm |
| 4,395,170 A | 7/1983 | Clarey |
| 4,498,682 A | 2/1985 | Glore |
| 4,583,751 A | 4/1986 | Rohm |
| 4,588,335 A | 5/1986 | Pearson, Jr. |
| 4,602,799 A | 7/1986 | Rohm |
| 4,609,199 A | 9/1986 | Rohm |
| 4,627,628 A | 12/1986 | Rohm |
| 4,655,464 A | 4/1987 | Manschitz et al. |
| 4,682,918 A | 7/1987 | Palm |
| 4,690,226 A | 9/1987 | Schnizler et al. |
| 4,695,065 A | 9/1987 | Komatsu et al. |
| 4,700,956 A | 10/1987 | Rohm |
| 4,702,651 A | 10/1987 | Kleine |
| 4,703,942 A | 11/1987 | Rohm |
| 4,824,298 A | 4/1989 | Lippacher et al. |
| 4,836,563 A | 6/1989 | Rohm |
| 4,840,387 A | 6/1989 | McCarthy |
| 4,842,288 A | 6/1989 | Ando |
| 4,844,482 A | 7/1989 | Rohm |
| 4,861,201 A | 8/1989 | Cuilleron |
| 4,874,181 A | 10/1989 | Hsu |
| 4,951,955 A | 8/1990 | Sakamaki |
| 4,955,623 A | 9/1990 | Rohm |
| 4,958,840 A | 9/1990 | Palm |
| 5,009,439 A | 4/1991 | Sakamaki |
| 5,031,925 A | 7/1991 | Tatsu et al. |
| 5,044,643 A | 9/1991 | Nakamura |
| 5,054,796 A | 10/1991 | Rohm |
| 5,125,673 A | 6/1992 | Huff et al. |
| 5,145,192 A | 9/1992 | Rohm |
| 5,145,193 A | 9/1992 | Rohm |
| 5,171,030 A | 12/1992 | Rohm |
| 5,172,923 A | 12/1992 | Nakamura |
| 5,174,588 A | 12/1992 | Reibetanz et al. |
| 5,183,274 A | 2/1993 | Sakamaki |
| 5,195,760 A | 3/1993 | Wheeler et al. |
| 5,199,833 A | 4/1993 | Fehrle et al. |
| 5,215,317 A | 6/1993 | Jordan et al. |
| 5,232,230 A | 8/1993 | Lin |
| 5,234,223 A | 8/1993 | Sakamaki |
| 5,236,206 A | 8/1993 | Rohm |
| 5,261,679 A | 11/1993 | Nakamura |
| 5,286,041 A | 2/1994 | Rohm |
| 5,322,303 A | 6/1994 | Nakamura |
| 5,330,204 A | 7/1994 | Huff et al. |
| 5,342,154 A | 8/1994 | Holzer |
| 5,348,317 A | 9/1994 | Steadings et al. |
| 5,348,318 A | 9/1994 | Steadings et al. |
| 5,375,857 A | 12/1994 | Rohm |
| 5,375,858 A | 12/1994 | Rohm |
| 5,375,950 A | 12/1994 | Schulz et al. |
| 5,411,275 A | 5/1995 | Huff et al. |
| 5,431,419 A | 7/1995 | Mack |
| 5,435,578 A | 7/1995 | Rohm |
| 5,452,906 A | 9/1995 | Huff et al. |
| 5,458,345 A | 10/1995 | Amyot |
| 5,464,229 A | 11/1995 | Salpaka |
| 5,464,230 A | 11/1995 | Rohm |
| 5,465,983 A | 11/1995 | Owens et al. |
| 5,476,273 A | 12/1995 | Shadeck et al. |
| 5,499,829 A | 3/1996 | Rohm |
| 5,499,830 A | 3/1996 | Schnizler |
| 5,501,473 A | 3/1996 | Barton et al. |
| 5,540,453 A | 7/1996 | Sakamaki |
| 5,573,254 A | 11/1996 | Huff et al. |
| 5,615,899 A | 4/1997 | Sakamaki |
| 5,624,125 A | 4/1997 | Rohm |
| 5,651,647 A | 7/1997 | Ray |
| 5,678,961 A | 10/1997 | Fleege et al. |
| 5,709,392 A | 1/1998 | Barton et al. |
| 5,741,016 A | 4/1998 | Barton et al. |
| 5,775,704 A | 7/1998 | Wilson et al. |
| 5,816,582 A | 10/1998 | Steadings et al. |
| 5,816,583 A | 10/1998 | Middleton |
| 5,826,888 A | 10/1998 | Weaver et al. |
| 5,829,761 A | 11/1998 | Rohm |
| 5,833,247 A | 11/1998 | Deuschle et al. |
| 5,882,153 A | 3/1999 | Mack et al. |
| 5,893,689 A | 4/1999 | Juhasz |
| 5,913,524 A | 6/1999 | Barton |
| 5,921,562 A | 7/1999 | Robison |
| 5,924,702 A | 7/1999 | Huff et al. |
| 5,957,469 A | 9/1999 | Miles et al. |
| 6,022,029 A | 2/2000 | Sakamaki |
| 6,053,675 A | 4/2000 | Holland et al. |
| 6,073,939 A | 6/2000 | Steadings et al. |
| 6,139,228 A | 10/2000 | Longo |
| 6,168,170 B1 | 1/2001 | Miles et al. |
| 6,179,301 B1 | 1/2001 | Steadings et al. |
| 6,193,241 B1 | 2/2001 | Robison |
| 6,196,554 B1 | 3/2001 | Gaddis et al. |
| 6,217,033 B1 | 4/2001 | Sakamaki et al. |
| 6,260,856 B1 | 7/2001 | Temple-Wilson |
| 6,264,208 B1 | 7/2001 | Sakamaki et al. |
| 6,293,559 B1 | 9/2001 | Harman, Jr. et al. |
| 6,302,407 B1 | 10/2001 | Hsueh |
| 6,390,481 B1 | 5/2002 | Nakamuro |
| 6,398,226 B1 | 6/2002 | Huggins et al. |
| 6,402,160 B1 | 6/2002 | Grogan et al. |
| 6,409,181 B1 | 6/2002 | Hsueh |
| 6,435,521 B2 | 8/2002 | Steadings et al. |
| 6,488,287 B2 | 12/2002 | Gaddis et al. |
| 6,517,088 B1 | 2/2003 | Rohm |
| 6,550,785 B2 | 4/2003 | Rohm |
| 6,575,478 B2 | 6/2003 | Rohm et al. |
| 6,648,563 B2 | 11/2003 | Rohm |
| 6,659,474 B2 | 12/2003 | Sakamaki et al. |
| 6,688,611 B2 | 2/2004 | Gifford et al. |
| 6,691,799 B2 | 2/2004 | Kuhnle et al. |
| 6,729,812 B2 | 5/2004 | Yaksich et al. |
| 6,820,700 B2 | 11/2004 | Funfer et al. |
| 6,824,141 B1 | 11/2004 | Sakamaki et al. |
| 6,832,764 B2 | 12/2004 | Steadings et al. |
| 6,843,485 B2 | 1/2005 | Sakamaki et al. |
| 6,848,691 B2 | 2/2005 | Yang et al. |
| 6,851,678 B2 | 2/2005 | Mack |
| 6,902,171 B2 | 6/2005 | Sakamaki et al. |
| 6,926,476 B1 | 8/2005 | Miyanaga |
| 6,959,931 B2 | 11/2005 | Sakamaki et al. |
| 7,128,503 B2 | 10/2006 | Steadings et al. |
| 7,207,573 B2 | 4/2007 | Sakamaki et al. |
| 7,360,770 B2 | 4/2008 | Luckenbaugh et al. |
| 7,841,601 B2 | 11/2010 | Mack |
| 8,070,168 B2 | 12/2011 | Mack |
| 8,262,096 B2 | 9/2012 | Mack |
| 8,403,339 B2 * | 3/2013 | Yaksich ............. B23B 31/123 279/140 |

FOREIGN PATENT DOCUMENTS

| | | |
|---|---|---|
| DE | 3418881 | 11/1985 |
| DE | 3617105 | 11/1987 |
| DE | 3914311 | 6/1990 |
| DE | 4238503 | 11/1993 |
| DE | 19506708 | 3/1996 |
| DE | 29600727 | 4/1996 |
| DE | 4438991 | 5/1996 |
| DE | 10 2005 018 392 | 10/2006 |
| DE | 10 2007 008 314 | 9/2007 |
| DE | 10 2006 050 916 | 4/2008 |
| EP | 0300375 | 1/1989 |
| EP | 0468128 | 1/1992 |
| EP | 0618029 | 10/1994 |
| EP | 0677348 | 10/1995 |
| EP | 0710518 | 5/1996 |
| EP | 0710519 | 5/1996 |
| EP | 0710520 | 5/1996 |

(56) References Cited

FOREIGN PATENT DOCUMENTS

| | | |
|---|---|---|
| EP | 0519412 | 3/1997 |
| EP | 1159102 | 9/2004 |
| EP | 1894651 | 3/2008 |
| FR | 2645056 | 10/1990 |
| GB | 2034210 | 6/1980 |
| GB | 2361885 | 11/2001 |
| GB | 2428609 | 2/2007 |
| GB | 2429668 | 3/2007 |
| JP | 57-48407/1986 | 3/1982 |
| JP | 1-92009/1989 | 4/1989 |
| JP | 1-289608/1989 | 11/1989 |
| JP | 3-49808/1991 | 3/1991 |
| JP | 3-270809/1991 | 12/1991 |
| JP | 4365504 | 12/1992 |
| JP | 08090316 | 4/1996 |
| JP | 2001-259907 | 9/2001 |
| WO | 2006/125146 | 11/2006 |

OTHER PUBLICATIONS

U.K. Office Action dated Mar. 7, 2012, for co-pending Application No. GB0910573.5.

Response dated May 4, 2012 to U.K. Office Action, for co-pending Application No. GB0910573.5.

Chinese Office Action dated May 21, 2012, for co-pending Chinese Application No. 200910173303.2.

Second Chinese Office Action dated Jan. 29, 2013, for co-pending Chinese Application No. 200910173303.2.

German Office Action dated Jan. 31, 2013, for co-pending German Application No. 10 2009 025 487.0-14.

German Office Action dated Aug. 25, 2015, for co-pending German Application No. 10 2009 025 487.0-14.

* cited by examiner

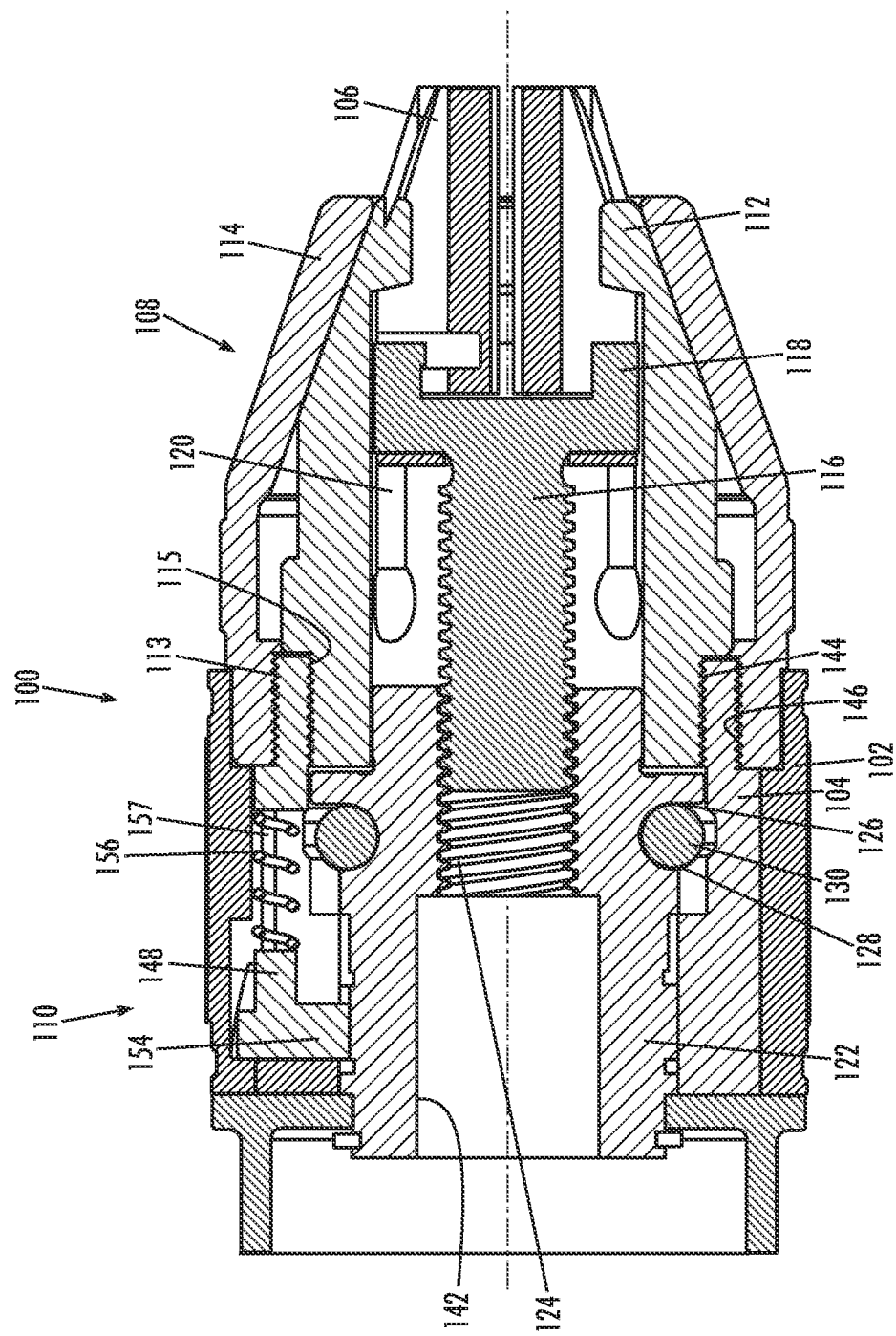

SELF TIGHTENING CHUCK WITH AN AXIAL LOCK

CLAIM OF PRIORITY

The present invention is a continuation of U.S. patent application Ser. No. 12/486,684 filed Jun. 17, 2009, now U.S. Pat. No. 8,403,339, which claims priority to U.S. Provisional Patent Application No. 61/073,419, entitled "Self Tightening Chuck with an Axial Lock", filed Jun. 18, 2008, the entire disclosures of which are incorporated by reference.

FIELD OF THE INVENTION

The present invention is directed to a chuck adapted to releasably hold a tool bit, such as a drill bit, of a manually or power-operated drill, or like rotary tool.

BACKGROUND OF THE INVENTION

Hand, electric and pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of a polygonal cross-section, the device is usually provided with a chuck that is adjustable. The chuck is often attached to the driver by a threaded or tapered bore.

A variety of chucks have been developed in the art. In an oblique jawed chuck, a chuck body includes three passageways disposed approximately 120 degrees apart from each other. The passageways are configured so that their center lines meet at a point along the chuck axis forward of the chuck. The passageways constrain three jaws that are movable in the passageways to grip a cylindrical or polygonal tool shank displaced approximately along the chuck center axis. The chuck includes a nut that rotates about the chuck center and that engages threads on the jaws so that rotation of the nut moves the jaws in either direction within the passageways. The body is attached to the drive shaft of a driver and is configured so that rotation of the body in one direction with respect to the nut forces the jaw into gripping relationship with the tool shank, while rotation in the opposite direction releases the gripping relationship. The chuck may be keyless if it is rotated by hand. Various configurations of keyless chucks are known in the art and are desirable for a variety of applications.

SUMMARY OF THE INVENTION

In one embodiment of the present invention, a chuck for use with a manual or power driver having a rotatable shaft, the chuck having a generally cylindrical body having a central longitudinal axis, a nose section, and a tail section. The tail section is configured to rotate with the drive shaft and the nose section has an axial bore formed therein. The chuck further has a plurality of jaws movably disposed with respect to the body in communication with the axial bore. The chuck further has a threaded spindle rotatably connected to the body and is in driving engagement with the jaws so that rotation of the threaded spindle in a locking direction moves the jaws toward the central longitudinal axis and rotation of the threaded spindle in an unlocking direction moves the jaws away from the central longitudinal axis. The chuck also has a first ring fixedly mounted about the body and placed intermediate the nose and tail section, the first ring has a first plurality of teeth. The chuck also has an inner sleeve rotatably mounted about the tail section of the body, the inner sleeve having at least one open portion proximate the tail section of the chuck. The chuck further has a second ring having at least one protrusion, where the at least one protrusion mates with the corresponding at least one open portion and extends outwardly from the inner sleeve. The chuck also having an outer sleeve rotatably mounted about the tail section and concentrically situated outside the inner sleeve, the outer sleeve having at least one lock groove with a locked end and an unlocked end, where the locked end extends further in a longitudinal direction toward the nose section than the unlocked end of the at least one lock grove. Where the at least one lock groove is arranged so that the at least one protrusion of the second ring is in contact with the at least one lock groove such that when the at least on protrusion is situated adjacent the locked end of the at least one lock groove, the first plurality of teeth of the first ring engage the second plurality of teeth of the second ring.

In a further embodiment of the invention, a chuck for use with a manual or power driver having a rotatable drive shaft, the chuck having a generally cylindrical body having a central longitudinal axis, a nose section, and a tail section, the tail section is configured to rotate with the drive shaft and the nose section has an axial bore formed therein. The chuck further has a plurality of jaws movably disposed with respect to the body in communication with the axial bore. The chuck further has a threaded spindle rotatably connected to the body and in driving engagement with the jaws so that rotation of the threaded spindle in a locking direction moves the jaws toward the central longitudinal axis and rotation of the threaded spindle in an unlocking direction moves the jaws away from the central longitudinal axis. The chuck also has an annular array of teeth formed about the body and placed intermediate the nose end tail section, where the annular array of teeth have a plurality of radially outward extending teeth. The chuck also has an inner sleeve rotatably mounted about the tail section of the body and the inner sleeve having an axially extending open section. The chuck further has a sliding lock situated within the open section of the inner sleeve, where the sliding lock has a protrusion that extends outwardly away from the body and a locking tooth that extends inwardly towards the body. A spring is situated within the open section of the inner sleeve, and the spring and sliding lock are configured such that the spring applies biases the sliding lock rearwardly toward the tail section. The chuck also has an outer sleeve rotatably mounted about the tail section and concentrically situated outside the inner sleeve, the outer sleeve having, a lock groove with a locked end and an unlocked end, where the locked end extends further in a longitudinal direction rearwardly toward the tail section than the unlocked end and where the lock groove is arranged to receive the protrusion of the sliding lock such that when the protrusion is situated adjacent the locked end of the lock groove, the radially inward extending lock tooth of the sliding lock lockingly engages the annular array of teeth formed about the body.

The accompanying drawings which are incorporated in and constitute a part of this specification, illustrate one or more embodiments of the invention, and together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which refers to the appended figures, in which:

FIG. 6 is a cross-sectional view of a chuck in a locked position, in accordance with a second embodiment of the present invention;

Figure 1:
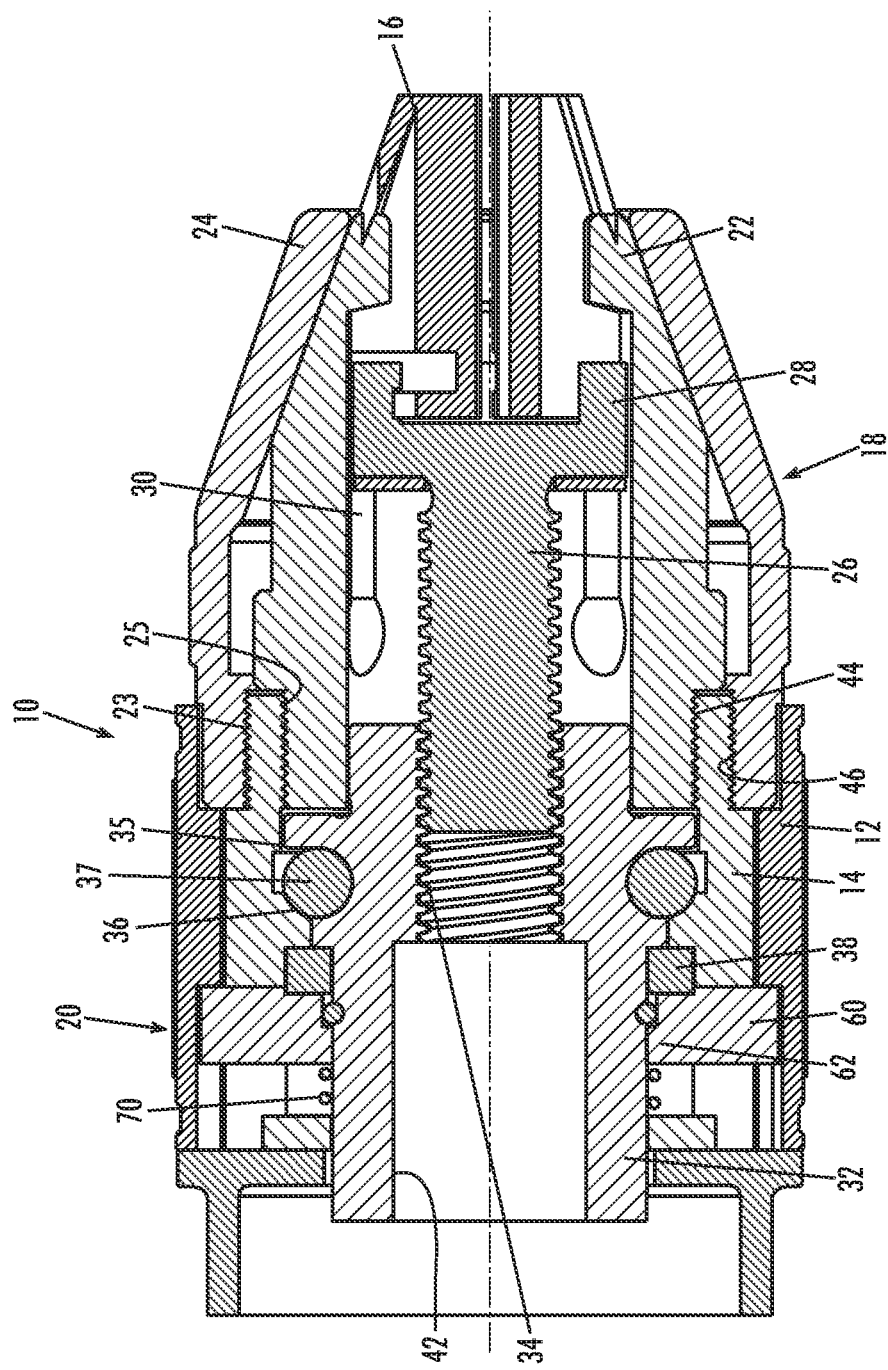
FIG. 1 is a cross-sectional view of a chuck in the locked position, in accordance with a first embodiment of the present invention.
Figure 2:
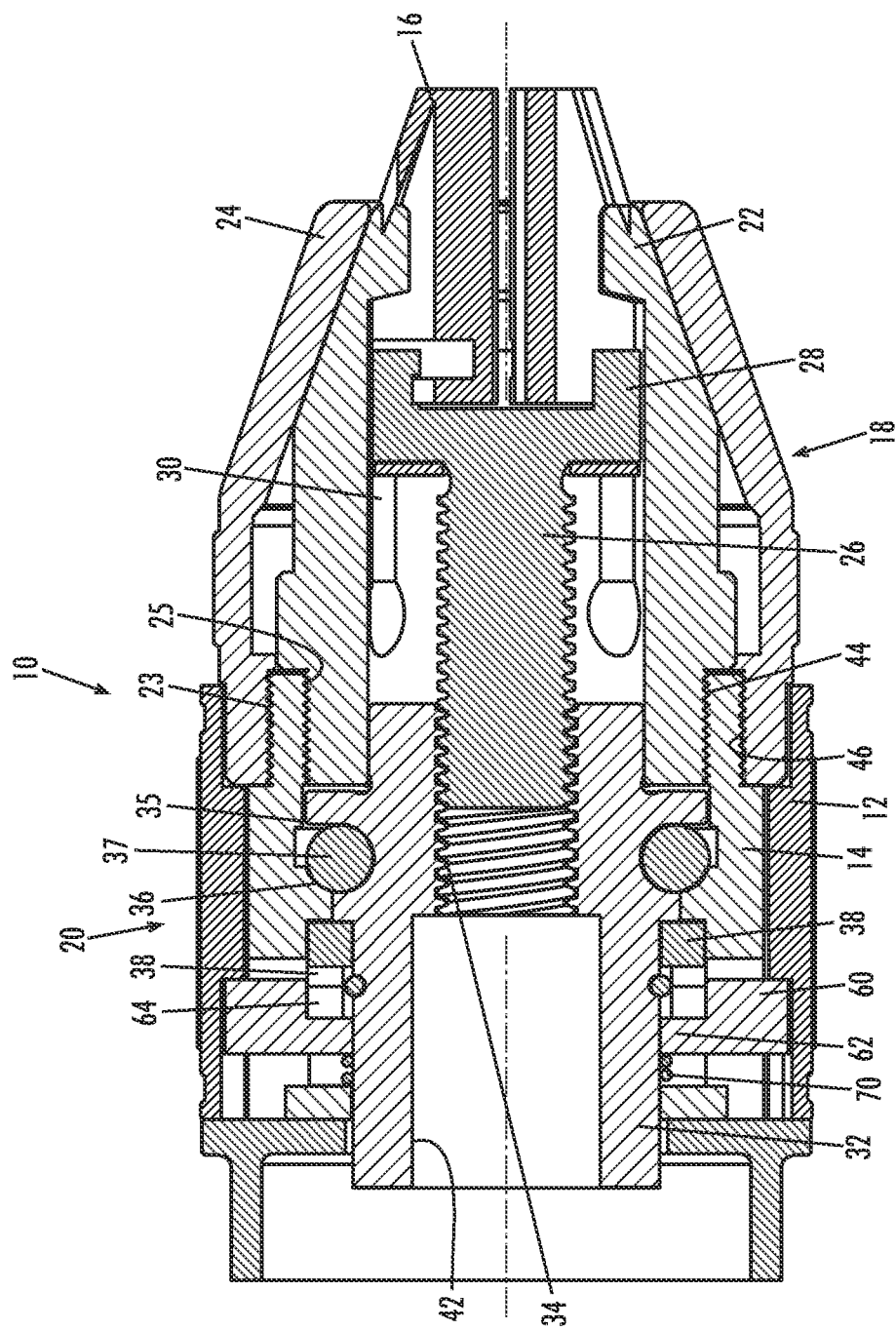
FIG. 2 is a cross-sectional view of the chuck, as shown in FIG. 1, in the unlocked position.
Figure 3:
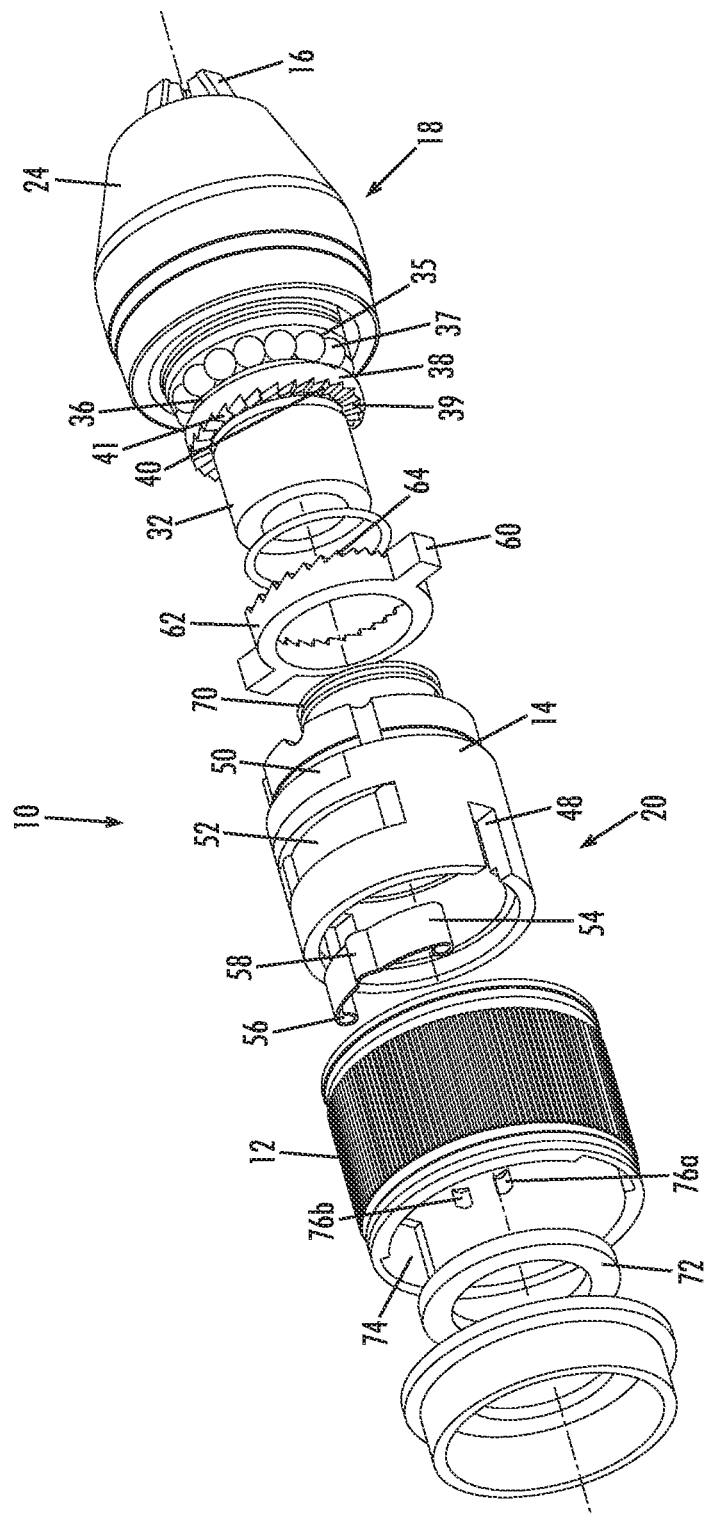
FIG. 3 is an exploded perspective view of the chuck, as shown in FIG. 1.

Repeat use of reference characters in the present specification and drawings is intended to represent same or analogous features or elements of the invention.

DETAILED DESCRIPTION OF THE INVENTION

One of ordinary skill in the art will understand that the present discussion is a description of exemplary embodiments only, and is not intended as limiting the broader aspects of the present invention, which broader aspects are embodied in the exemplary construction. A repeat use of reference characters in the present specification and drawings represents the same or analogous features or elements of the invention.

First Embodiment

Referring generally to FIGS. 1 through 5, an embodiment of a chuck 10 for a rotary tool in accordance with a first embodiment of the present invention is shown. Chuck 10 includes an outer sleeve 12, an inner sleeve 14 and a plurality of jaws 16. Chuck 10 is generally cylindrical in shape and includes a nose or forward section 18 at its front end and a tail or rearward section 20 at its back end.

Forward section 18 of chuck 10 generally comprises an inner and an outer nosepiece 22 and 24, respectively, plurality of jaws 16, and a threaded spindle 26 including a head 28. Both inner and outer nosepieces 22 and 24 are hollow and each is conical in shape at its front end and cylindrical in shape at its back end. Further, each includes a threaded portion 23 and 25 at its back end. Inner nosepiece 22 is situated within outer nosepiece 24 concentrically at their back ends, and their front ends are in contact with one another.

Jaws 16 are movably received on inner nosepiece 22 and can be retracted within inner nosepiece 22 or projected outwardly from the front end of inner nosepiece 22 by means of threaded spindle 26. Jaws 16 are slidably received within guide slots 30 which are formed on inner nosepiece 22 intermediate its front and back ends. The back ends of jaws 16 are non-rotatably, yet radially slidably, fixed to head 28 of threaded spindle 26, and all are located within both inner and outer nosepieces 22 and 24.

Rearward section 20 of chuck 10 generally includes a body 32, inner sleeve 14 and outer sleeve 12. Outer sleeve 12 forms the outer portion of reward section 20 of chuck 10. Inner sleeve 14 is located within outer sleeve 12 and body 32 is located within both inner sleeve 14 and outer sleeve 12. Outer sleeve 12, inner sleeve 14 and body 32 are concentric. Body 32 includes a threaded bore 34 at its front end which threadably receives threaded spindle 26.

An annular bearing groove 35 is located proximate the front end of body 32. A corresponding annular bearing groove 36 is formed on the inner surface of inner sleeve 14. Ball bearings are received within bearing grooves 35 and 36 and aid in the rotation of body 32 relative to the other components of chuck 10. Body 32 additionally includes, intermediate the front and back ends, a first lock ring 38 that is axially and non-rotatably fixed to the outside of body 32. The first lock ring 38 includes an annular array of axially rearwardly extending teeth 39, each with a first side 40 and a second side 41. Each first side 40 has a slope approaching 90°, and each second side 41 has a slope that is approximately 45°. Body 32 further includes a bore 42 formed in its back end and which is of standard size to mate with the drive shaft of a powered or hand driver (not shown).

Inner sleeve 14 includes a first threaded surface 44 formed on its inner surface adjacent its front end and a second threaded surfaced 46 formed on its outer surface adjacent its front end. First threaded surface 44 receives threaded surface 23 formed at the back end of inner nosepiece 22 and second threaded surface 46 receives threaded surfaces 25 formed at the back end of outer nosepiece 24. Inner sleeve 14 is therefore non-rotatably fixed to both inner and outer nosepieces 22 and 24 such that they rotate as a single unit about body 32. As best seen in FIGS. 1 though 3, the back end of inner sleeve 14 includes slots 48 formed opposite to each other. Further, the outer portion of inner sleeve 14 contains a flat 50 and a recess 52 which receives a detent spring 54. Flat 50 is a recessed portion including an "unlocked" end 50a and a "locked" end 50b. Detent spring 46 includes a left and right end formed into loops 56 to receive rods (not shown) to hold detent spring 54 within recess 52. Detent spring 54 further includes a raised portion 58 which is located intermediate the left and right ends of detent spring 54 and extends radially outwardly therefrom.

Slots 48 of inner sleeve 14 receive tabs 60 of a second lock ring 62 that is axially movable with regard to body 32. Tabs 60, like slots 48, are located opposite each other. Second lock ring 62 is made up of axially forwardly extending teeth 64, each with a first side 66 and a second side 68. Each first side 66 has a slope approaching 90° and each second side 68 has a slope that is approximately 45°. A spring 70 is located at the back portion of second lock ring 62 and is in communication at its back end with a retainer 72 that keeps spring 70 in place such that spring 70 biases second locking ring 62 axially forward on body 32.

Figure 4:
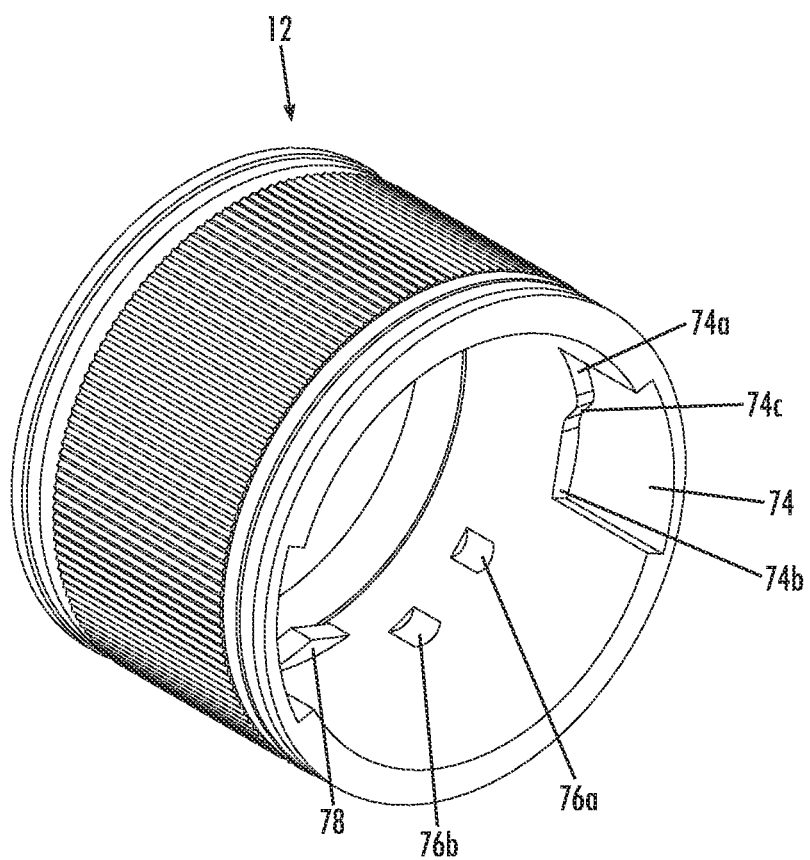
FIG. 4 is a perspective view of the outer sleeve of the chuck, as shown in FIG. 1, wherein a portion of the outer sleeve is removed.
Figure 5A:
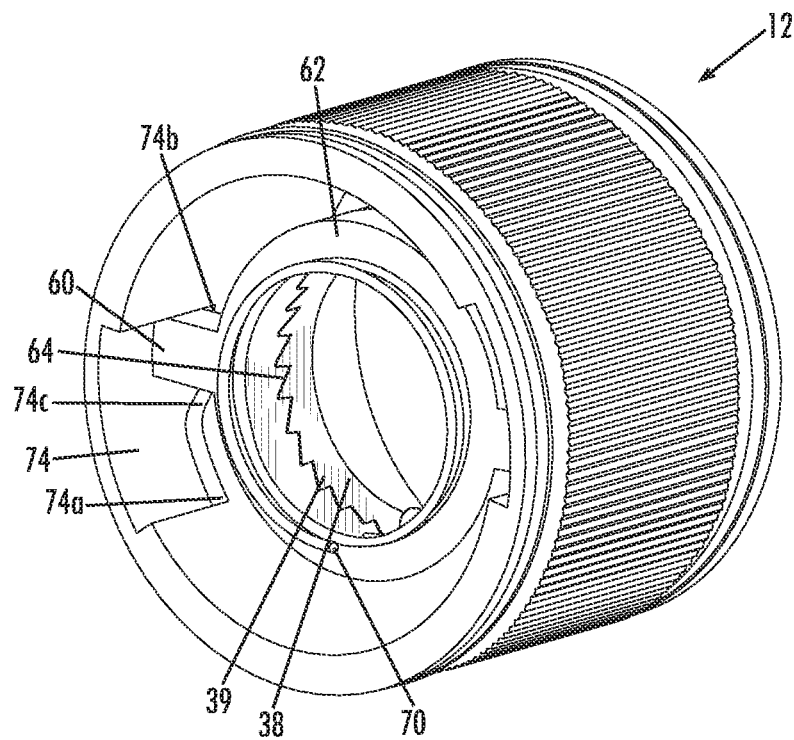
FIG. 5A is a perspective view of the outer sleeve and the second lock ring of the chuck, as shown in FIG. 1, wherein the second lock ring is in the locked position.
Figure 5B:
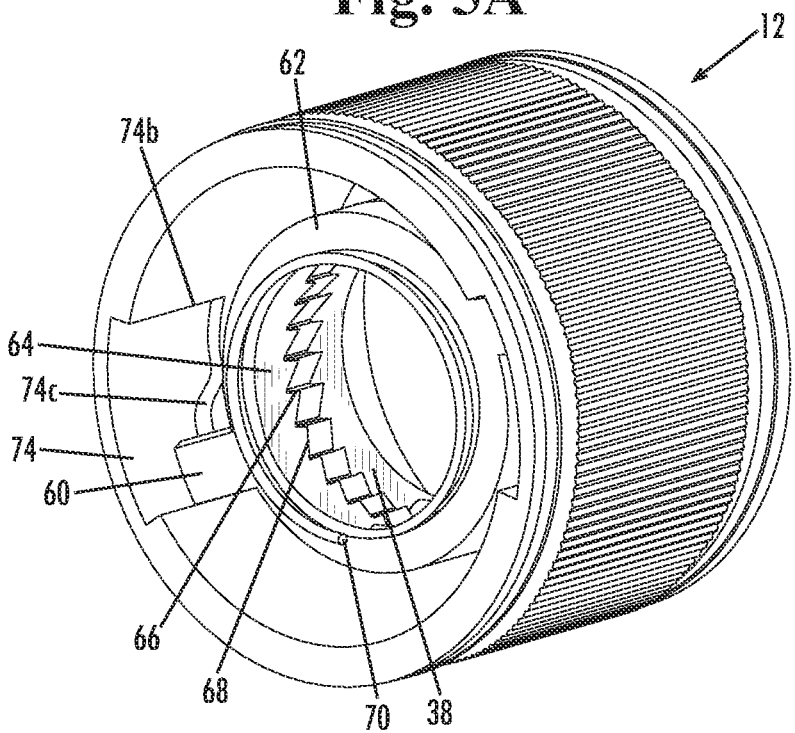
FIG. 5B is a perspective view of the outer sleeve and the second lock ring of the chuck, as shown in FIG. 1, wherein the second lock ring is in the locked position.
Figure 7:
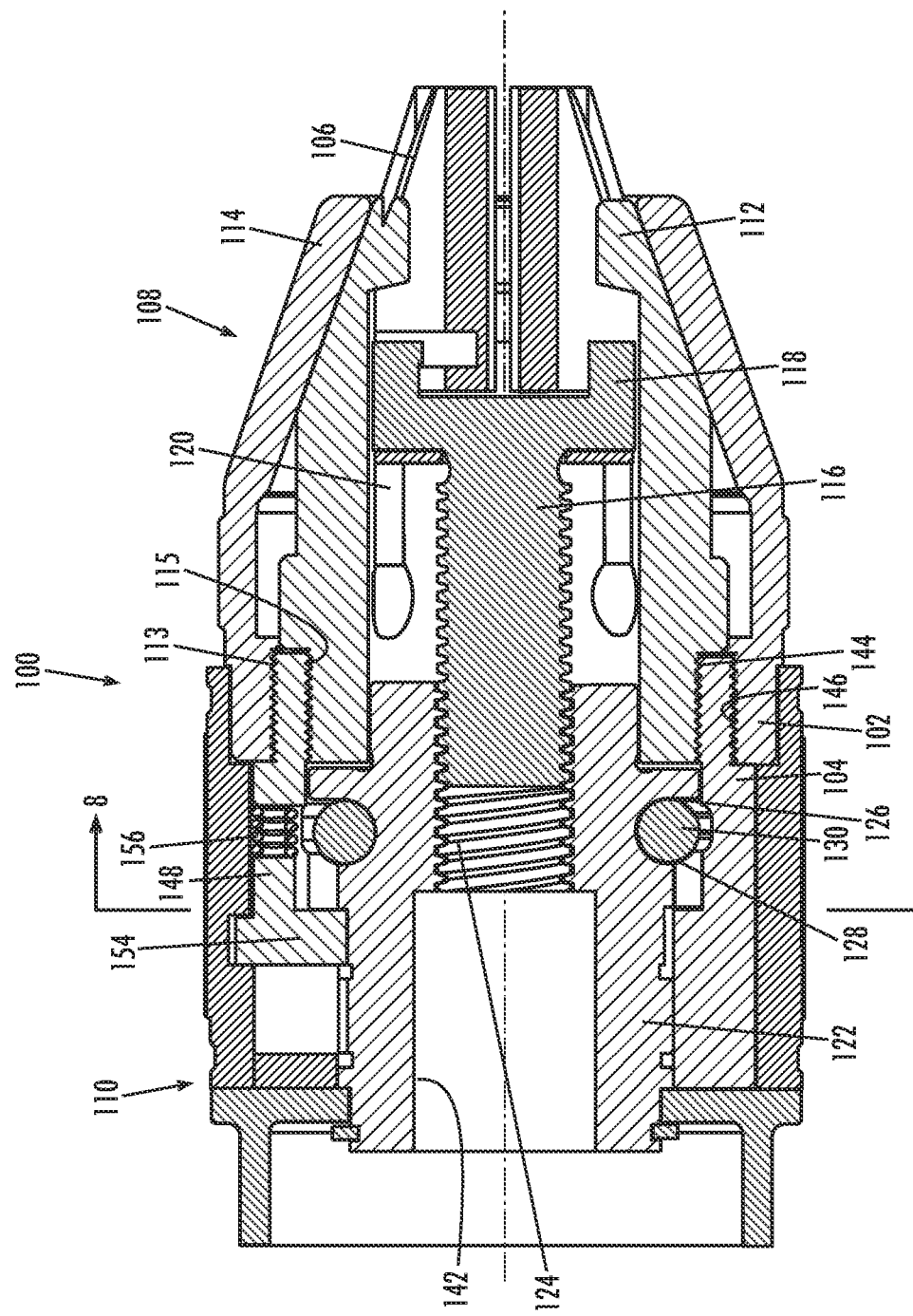
FIG. 7 is a cross-sectional view of the chuck, as shown in FIG. 6, in the unlocked position.
Figure 8:
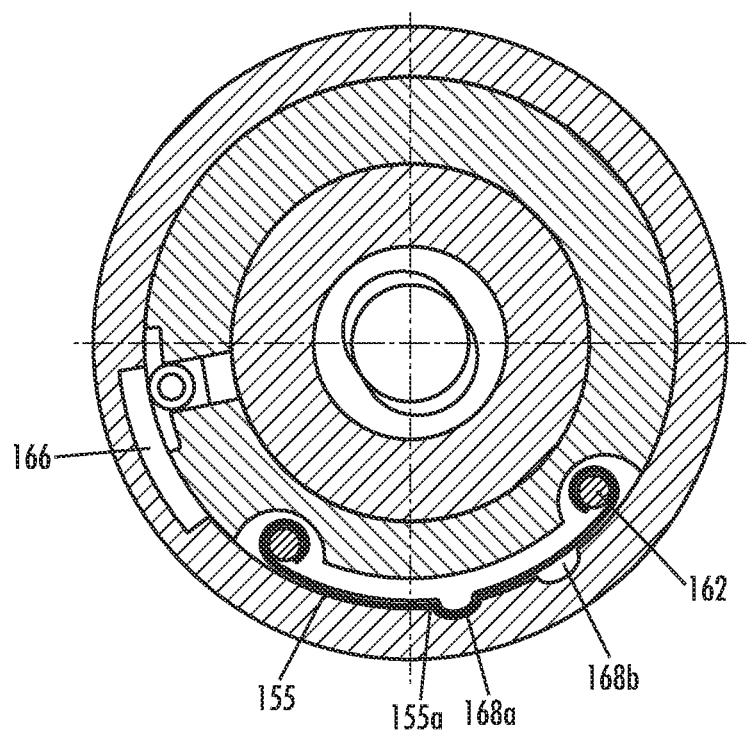
FIG. 8 is a cross-sectional view of the chuck, as shown in FIG. 6, taken along line 8-8 of FIG. 7.
Figure 9:
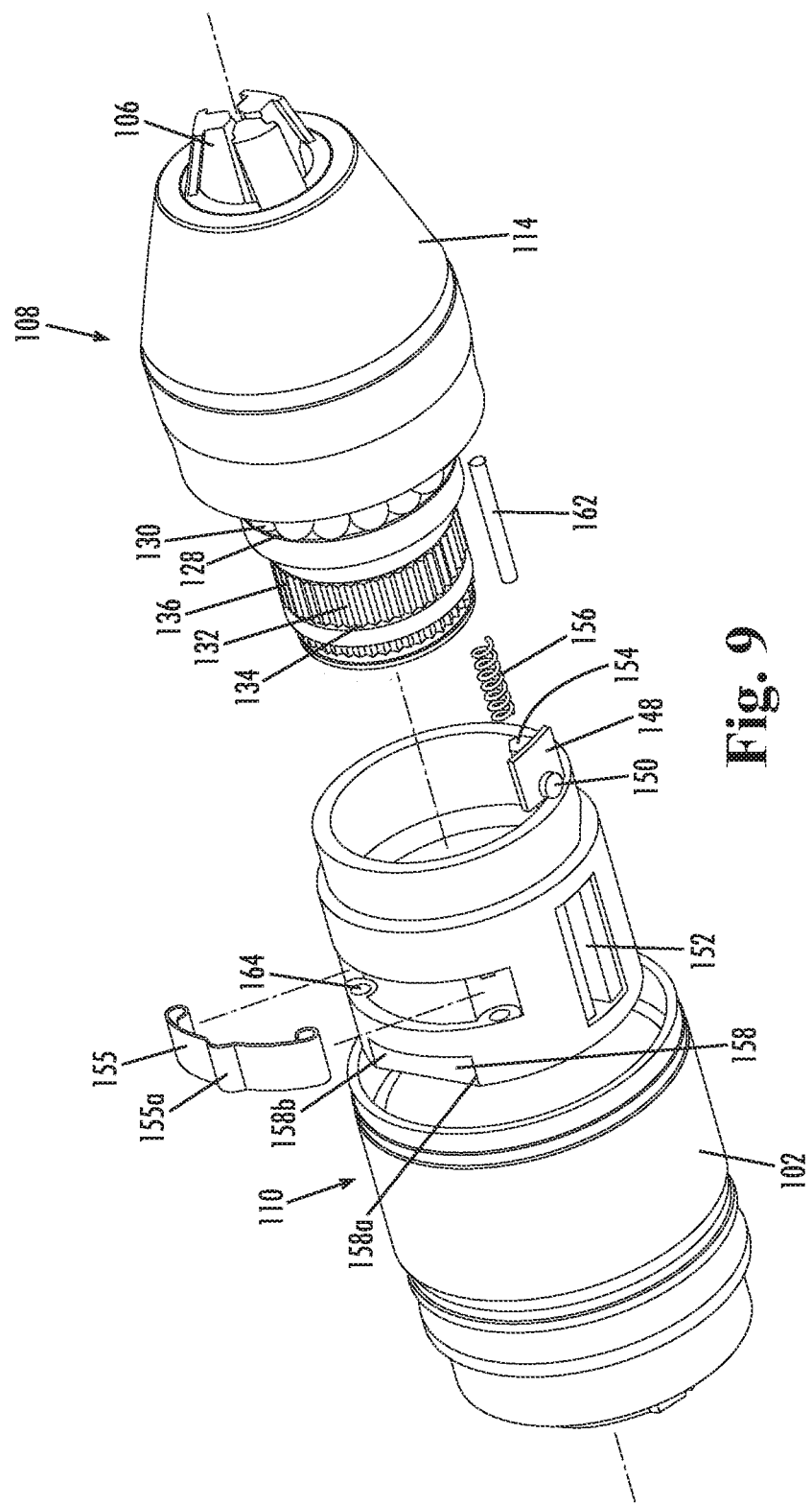
FIG. 9 is an exploded perspective view of the chuck, as shown in FIG. 6.
Figure 10A:
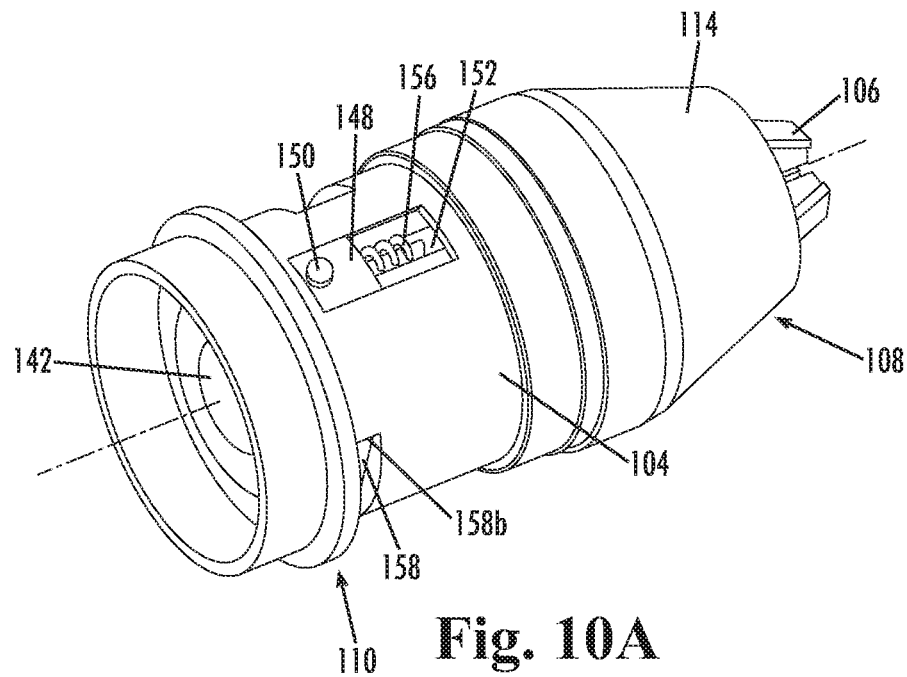
FIG. 10A is a partial perspective view of the chuck as shown in FIG. 6, in a locked position, wherein the outer sleeve has been removed.
Figure 10B:
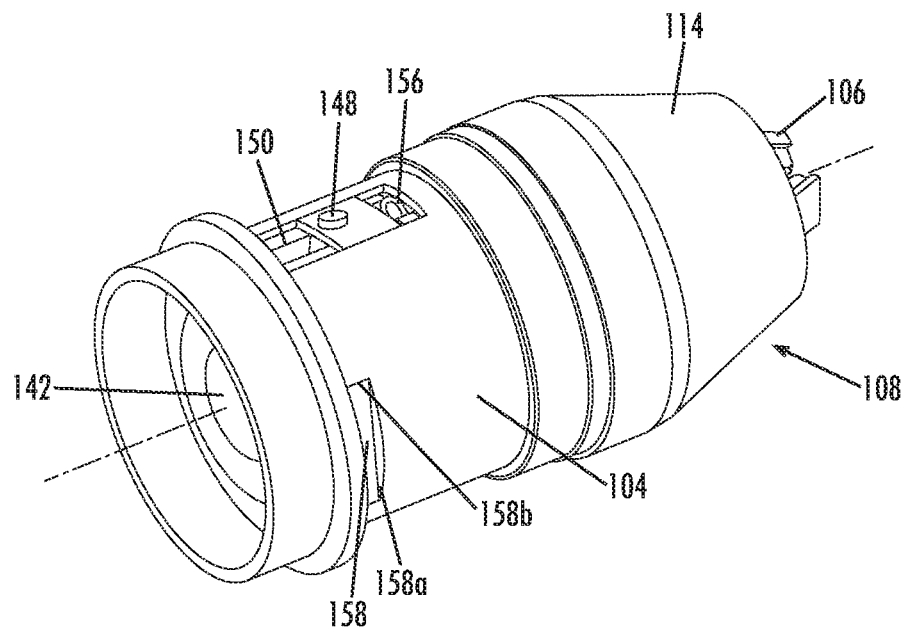
FIG. 10B is a partial perspective view of the chuck as shown in FIG. 6, in an unlocked position, wherein the outer sleeve has been removed.
Figure 11A:
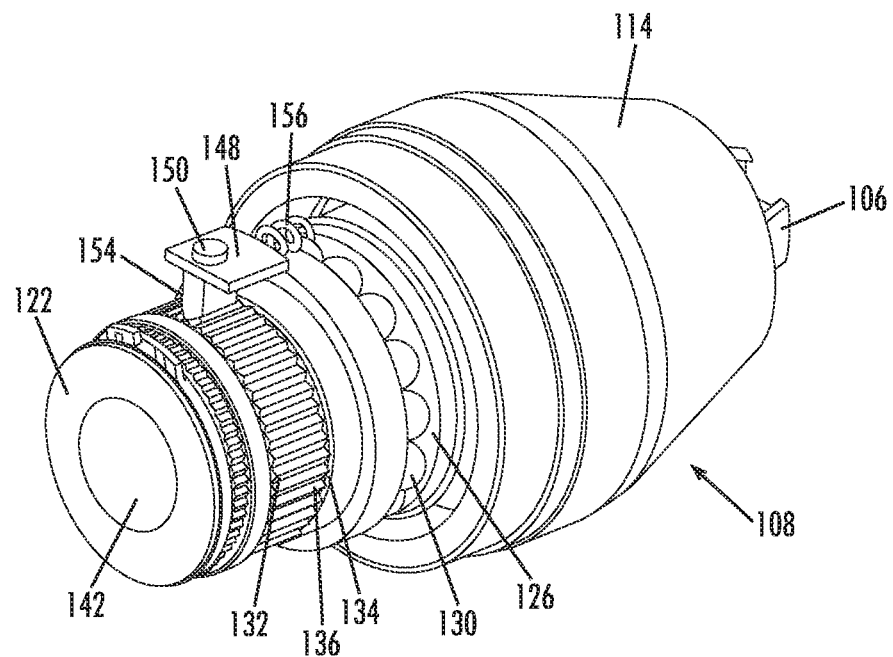
FIG. 11A is a perspective view of the nose section and the body of the chuck, as shown in FIG. 6, in a locked position.
Figure 11B:
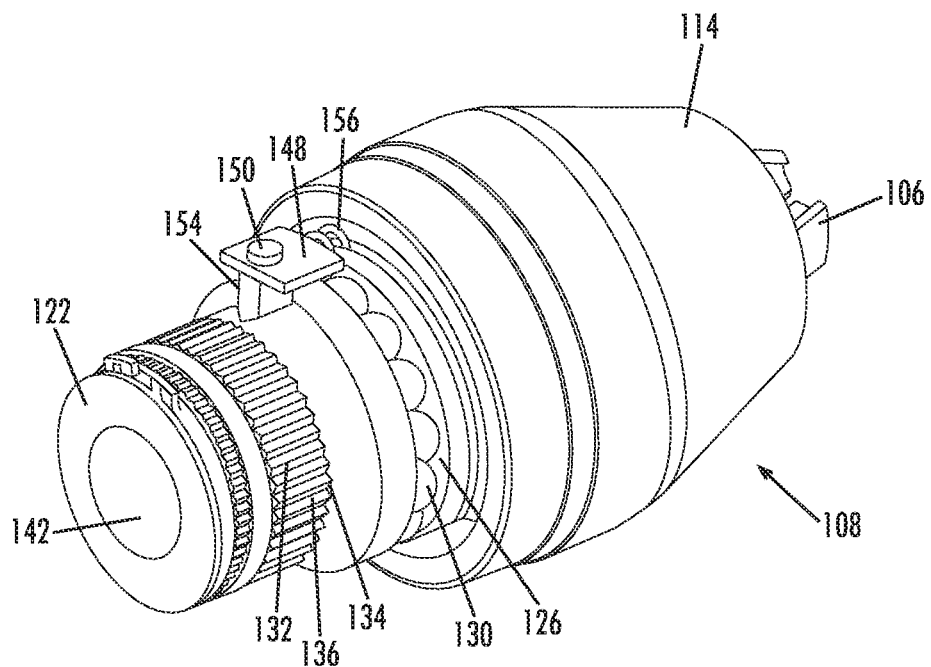
FIG. 11B is a perspective view of the nose section and the body of the chuck, as shown in FIG. 6, in an unlocked position.
Figure 12A:
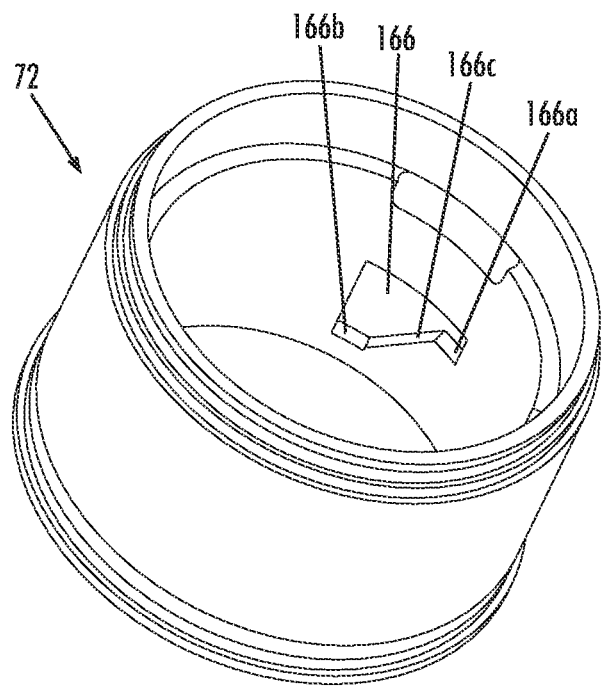
FIG. 12A is a front perspective view of the outer sleeve of the chuck, as shown in FIG. 6.
Figure 12B:
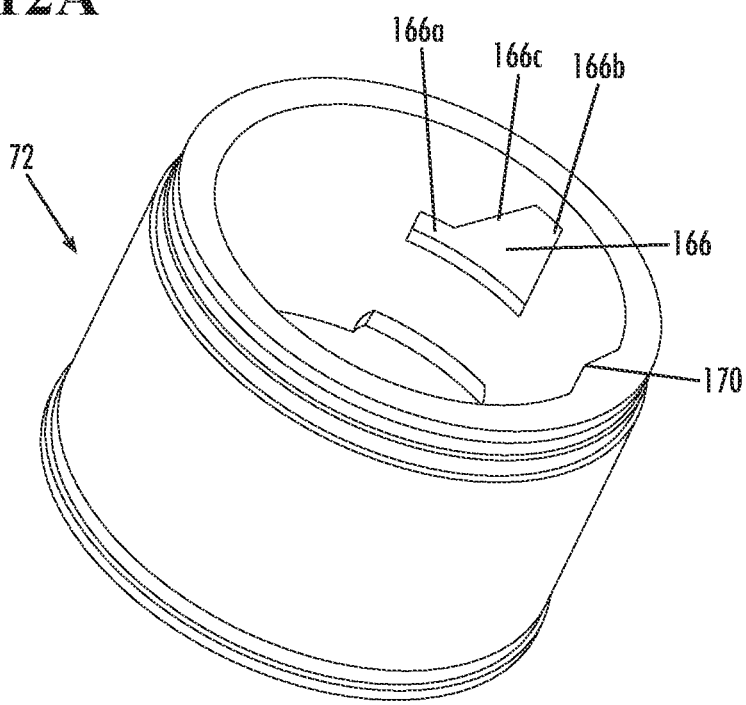
FIG. 12B is a back perspective view of the outer sleeve of the chuck, shown in FIG. 6.

Outer sleeve 12, as stated above, is situated around inner sleeve 14 and is of a suitable circumference such that, as shown in FIGS. 5A and 5B, tabs 60 of second lock ring 62 and raised portion 58 are in contact with the inner surface of outer sleeve 12. Tabs 60 of second lock ring 62 are situated within a pair of lock grooves 74 located on the inner portion of outer sleeve 12. Lock grooves 74 are recesses within the inner surface of outer sleeve 12 and contain an "unlocked" end 74a and a "locked" end 74b. Locked end 74b of lock groove 74 is formed by a recess that extends further longitudinally along the inner wall of outer sleeve 12 toward its front end than the recess that forms unlocked end 74a of each lock groove 74. A camming surface 74c extends between unlocked end 74a and locked end 74b. As best seen in FIG. 4, raised portion 58 is allowed to travel between two detent depressions 76a and 76b on the inner surface of outer sleeve 12, one being an "unlocked" detent depression 76a and the other a "locked" detent depression 76b. As well, the inside portion of outer sleeve 12 includes a stop 78. Stop 78 is a protrusion which extends into flat 50 of inner sleeve 14 and engages either of the opposing sides of flat 50 when outer sleeve 12 is rotated between the locked and unlocked positions, as described below.

The resting positions for outer sleeve 12 of chuck 10 are either the locked or unlocked positions. The unlocked position is defined when tabs 60 of second lock ring 62 are situated within unlocked ends 74a of lock grooves 74 of outer sleeve 12. As stated above, unlocked end 74a of each lock groove 74 does not extend as far longitudinally along the inner surface of outer sleeve 12 as does locked end 74b. With tabs 60 of second lock ring 62 positioned at unlocked ends 74a of lock grooves 74, second lock ring 62 is urged rearwardly against spring 70, causing spring 70 to compress and teeth 64 of second lock ring 62 to be disengaged from teeth 39 of first lock ring 38. Further, in the unlocked position, the raised portion 58 of detent spring 54 is situated within unlocked detent depression 76a. As well, stop 78 of outer sleeve 12 is positioned such that it is in contact with unlocked end 50a of flat 50. In the unlocked position, when viewing the chuck from the rear, outer sleeve 12 cannot be turned further in a clockwise direction relative to inner sleeve 14. Further movement of outer sleeve 12 in the clockwise direction relative to inner sleeve 14 is prevented by interaction of tabs 60 with unlocked ends 74a of respective lock grooves 74 and stop 78 with unlocked end 50a of flat 50.

To operate chuck 10, a user, when viewing chuck 10 from the rear, turns outer sleeve 12 in a counterclockwise, or tightening, direction. This rotation of outer sleeve 12 causes inner sleeve 14 and inner and outer nosepieces 22 and 24 to all rotate together in the same direction about body 32. As such, jaws 16 rotate with inner sleeve due to interaction with guide slots 30. Because jaws 16 are non-rotatably fixed to head 28 of spindle 26, spindle 26 is rotated within threaded bore 34 of body 32, subsequently causing jaws 16 to move forward and together to clamp onto the shank of the tool bit (not shown). When jaws 16 make contact with the tool bit, inner sleeve 14 and inner and outer nosepieces 22 and 24 can no longer rotate, leaving only outer sleeve 12 to move. Outer sleeve 12 continues to move in the tightening direction relative to inner sleeve 14 until it is in the locked position.

The locked position is defined by tabs 60 of second lock ring 62 being situated within locked ends 74b of lock groove 74. As outer sleeve 12 moves from the unlocked to the locked position, tabs 60 move from unlocked end 74a along camming surface 74c to locked end 74b of lock grooves 74. As such, spring 70 biases second lock ring 62 toward the front end of outer sleeve 12 since locked end 74b of lock groove 74 is closer to the front end of outer sleeve 12 than is the unlocked end 74a. The movement of second lock ring 62 closer to the front of chuck 10 due to the biasing force of spring 70 causes first and second sides 66 and 68 of teeth 64 of second lock ring 62 to engage the corresponding first and second sides 40 and 41 of teeth 39 of first lock ring 38, which is fixed to body 32. Additionally, as outer sleeve 12 is rotated from the unlocked position to the locked position, raised portion 58 of detent spring 54 moves to locked detent depression 76b, and stop 78 of outer sleeve 12 moves from unlocked end 50a of flat 50 to locked end 50b. The engagement of the teeth of first and second lock rings 38 and 62 prevents rotation of outer sleeve 12, inner sleeve 14, and first and second nosepieces 22 and 24 relative to body 32 in the clockwise, or opening, direction. Note, however, that continued rotation about body 32 in the counterclockwise, or tightening direction, is still possible. More specifically, as teeth 64 of second lock ring 62 rotate in a tightening direction, second side 68 of teeth of second lock ring 62 repeatedly slip over teeth 39 of first lock ring 38 causing a clicking or ratcheting sound as each second side 68 of teeth 64 of second lock ring 62 falls against each subsequent second side 41 of teeth 34 of first lock ring 38. The position of raised portion 58 of detent spring 54 within locked detent depression 76a prevents inadvertent rotation of outer sleeve 12 relative to inner sleeve 14 in the opening direction. As such, chuck 10 will remain locked until a user rotates outer sleeve 12 in the opening direction with enough force to cause detent spring 54 to move from locked detent depression 76b to unlocked detent depression 76a, as described below.

To open chuck 10, starting from the locked position, a user, when viewing chuck 10 from the rear, turns outer sleeve 12 in a clockwise, or loosening direction. As outer sleeve 12 begins to rotate, detent spring 54 is disengaged from locked detent depression 76b and stop 78 moves from locked end 50b of flat 50 to unlocked end 50a, at which point detent spring 54 engages unlocked detent depression 76a. As outer sleeve 12 rotates relative to inner sleeve 14, tabs 60 of second lock ring 62 are urged rearwardly by camming surfaces 74c of respective lock grooves 74 toward unlocked ends 74a of each groove, thereby causing second lock ring 62 to move rearwardly against the spring force of spring 70. Once teeth 64 of second lock ring 62 are no longer engaged with teeth 39 of first lock ring 38, outer sleeve 12, inner sleeve 14, and inner and outer nosepieces 22 and 24 start to rotate as a unit about body 32. As such, jaws 16 are disengaged from the shank of the tool bit, and chuck 10 can be fully opened.

Second Embodiment

Referring generally to FIGS. 6 to 12, an embodiment of a chuck 100 for a rotary tool in accordance with a second embodiment of the invention is shown. Chuck 100 includes an outer sleeve 102, an inner sleeve 104 and a plurality of jaws 106. Chuck 100 is generally cylindrical in shape and includes a nose or forward section 108 at its front end and a tail or rearward section 110 at its back end.

Forward section 108 of chuck 70 generally includes an inner and an outer nosepiece 112 and 114, respectively, plurality of jaws 106, and a threaded spindle 116 including a head 118. Both inner and outer nosepieces 112 and 114 are hollow and each is conical in shape at its front end and cylindrical in shape at its back end. Further, each includes a threaded portion 113 and 115 at its back end. Inner nosepiece 112 is situated within outer nosepiece 114 concentrically at their back ends, and their front ends are in contact with one another.

Jaws 106 are movably received on inner nosepiece 112 and can be retracted within inner nosepiece 112 or projected outwardly from the front end of inner nosepiece 112 by means of threaded spindle 116. Jaws 106 are slidably received within guide slots 120 which are formed on inner nosepiece intermediate its front and back ends. The back ends of jaws 106 are non-rotatably, yet radially slidably, fixed to head 118 of threaded spindle 116, and all are located within both inner and outer nosepieces 112 and 114.

Rearward section 110 of chuck 100 generally includes a body 122, inner sleeve 104 and outer sleeve 102. Outer sleeve 102 forms the outer portion of rearward section 110 of chuck 110. Inner sleeve 104 is located within outer sleeve 102 and body 122 located within both outer sleeve 102 and inner sleeve 104. Outer sleeve 102, inner sleeve 104, and body 122 are concentric. Body 122 includes a threaded bore 124 at its front end which threadably receives threaded spindle 116.

An annular bearing groove 126 is located proximate the front end of body 122. A corresponding annular bearing groove 128 is formed on the inner surface of inner sleeve 104. Ball bearings 130 are received within bearing grooves 126 and 128 and aid in the rotation of body 122 relative to the other components of chuck 100. Body 122 additionally includes, on the outer portion of body 122 and intermediate the front and back ends of body 122, an annular array of locking teeth 132 formed on the outer surface of body 122. The teeth 136 of the annular array are radially outwardly extending, each with a first side and a second side. Each first side has a slope approaching 90° and second side has a slope that is approximately 45°. Body 122 further includes a bore 142, which is of standard size to mate with the drive shaft of a powered or hand driver (not shown).

Inner sleeve 104 includes a first threaded surface 144 formed on its inner surface adjacent its front end and a second threaded surface 146 formed on its outer surface adjacent its front end. First threaded surface 144 receives threaded surface 113 formed at the back end of inner nosepiece 112 and second threaded surface 146 receives threaded surface 115 formed at the back end of outer nosepiece 114. Inner sleeve 104 is therefore non-rotatably fixed to both inner and outer nosepieces 112 and 114 such that they rotate as a single unit about body 122. Inner sleeve 104 includes a sliding lock 144 with a protrusion 150 extending radially outward therefrom. Sliding lock 148 is allowed to travel along a sliding lock track 152 and has a lock tooth 154 to engage annular array of locking teeth 132 of body portion 122 when in the locked position. Within sliding lock track 152 is a spring 156 that is located to restrict the movement of sliding lock 148 and to help in keeping sliding lock 148 in position. The spring 156 is held in place on the track 152 by a pin 157 that extends the length of track 152 and fits through sliding lock 148 and spring 156. Inner sleeve 104 additionally includes a flat 158. Flat 158 is a recessed portion including an "unlocked" end 158a and a "locked" end 158b. Inner sleeve 104 further contains a recess 160 that is configured to receive a detent spring 155 with a raised portion 155a. Detent spring 155 is held in place by rods 162 which fit through holes 164 located within recess 160 and extend through the loop ends of detent spring 155.

Outer sleeve 102, as stated above, is situated around inner sleeve 104 and is of a suitable circumference such that protrusion 150 of sliding lock 148 and the raised portion of the detent spring 155 are in contact with the inner surface of outer sleeve 102. Protrusion 150 of sliding lock 148 is situated within a lock groove 166 located on the inner surface of outer sleeve 102. Lock groove 166 is a recess within the inner surface of outer sleeve 102 and contains an "unlocked" end 166a and a "locked" end 166b. Unlocked end 166a of lock groove 166 is formed by a recess that extends further longitudinally along the inner wall of outer sleeve 102 toward its front end than the recess that forms locked end 166b of lock groove 166. A camming surface 166c extends between unlocked end 166a and locked end 166b. Raised portion 155a of detent spring 155 is allowed to travel between two detent depressions 168a and 168b on the inside surface of outer sleeve 102, one being an "unlocked" detent depression 168a, and the other a "locked" detent depression 168b. Finally, the inside portion of outer sleeve 102 includes a stop 170. Stop 170 is a protrusion which extends into flat 158 of inner sleeve and engages either of the opposing sides of flat 158 when outer sleeve 102 is rotated between the locked and unlocked positions, as described below.

The resting positions for outer sleeve 102 of chuck 100 are either the locked or unlocked position. The unlocked position is defined when the protrusion 150 of sliding lock 148 is situated within unlocked end 166a of lock groove 166 of outer sleeve 102. As stated above, unlocked end 166a of lock groove 166 extends further longitudinally along the inner surface of outer sleeve 102 toward its front end than does locked end 166b. With protrusion 150 of sliding lock 148 positioned at unlocked end 166a of lock groove 166, sliding lock 104 is urged forwardly against spring 156, causing spring 156 to compress and lock tooth 154 to be disengaged from locking teeth 132 of body 122. Further, in the unlocked position, raised portion 155a of detent spring 155 is situated within unlocked detent depression 168a. As well, stop 170 of the outer sleeve 102 is positioned such that it is in contact with unlocked end 158a of flat 158. In the unlocked position, when viewing the chuck from the rear, outer sleeve 102 cannot be turned further in a clockwise direction relative to inner sleeve 104. Further movement of outer sleeve 102 in the clockwise direction relative to inner sleeve 104 is prevented by interaction of protrusion 150 with unlocked end 166a of lock groove 166 and stop 170 with unlocked end 158a of flat 158.

To operate chuck 100, a user, when viewing chuck 100 from the rear, turns outer sleeve 102 in a counterclockwise, or tightening, direction. This rotation of outer sleeve 102 causes inner sleeve 104 and inner and outer nosepieces 112 and 114 to all rotate together in the same direction about body 122. As such, jaws 106 rotate with inner sleeve 104 due to interaction with guide slots 120. Because jaws 106 are non-rotatably fixed to head 118 of spindle 116, spindle 116 is rotated with threaded bore 124 of body 122, subsequently causing jaws 106 to move forward and together to clamp onto the shank of the tool bit (not shown). When jaws 106 make contact with the tool bit, inner sleeve 104 and inner and outer nosepieces 112 and 114 can no longer rotate, leaving only outer sleeve 102 to move. Outer sleeve 102 continues to rotate in the tightening direction relative to inner sleeve 104 until it is in the locked position.

The locked position is defined by protrusion 150 of sliding lock 148 being situated within locked end 166b of lock groove 166. As outer sleeve 102 moves from the unlocked to the locked position, protrusion 150 and sliding lock 148 moves from unlocked end 166a along camming surface 166c to locked end 166b of lock groove 166. The movement of sliding lock 148 further to the rear of chuck 100 due to the biasing force of spring 156 causes lock tooth 154 of sliding lock 148 to engage the space between the first and second sides of adjacent teeth of annular array of locking teeth 132 of body 122. Additionally, as outer sleeve 102 is rotated from the unlocked to the locked position, raised portion 155a of detent spring 155 moves to locked detent depression 168b, and stop 170 of outer sleeve 102 moves from unlocked end 158a of flat 158 to locked end 158b. The engagement of lock tooth 154 of sliding lock 148 and annular array of locking teeth 132 prevents rotation of outer sleeve 102, inner sleeve 104, and first and second nosepieces 112 and 114 relative to the body in the clockwise, or opening, direction. Note, however, that continued rotation about the body 122 in the counterclockwise, or tightening, direction, is still possible. More specifically, as the lock tooth 154 rotates in a tightening direction, the lock tooth 154 repeatedly slips over the second side of each tooth 136 of the annular array of locking teeth 132 causing a clicking or ratcheting sound as the locking tooth 107 falls against each subsequent space between adjacent teeth of the annular array of locking teeth 132. The position of raised portion 155a of detent spring 155 within locked end 166b of lock groove 166 prevents inadvertent rotation of outer sleeve 102 relative to inner sleeve 104 in the opening direction. As such, chuck 100 will remain locked until a user rotates outer sleeve 102 in the opening direction with enough force to cause raised portion 155a of detent spring 155 to move from locked detent depression 168b to unlocked detent depression 168a, as described below.

To open chuck 100 from the locked position, a user, when viewing chuck 100 from the rear, turns outer sleeve 102 in a clockwise, or loosening, direction. As outer sleeve 102 begins to rotate, raised portion 155a of detent spring 155 is disengaged from locked detent depression 168b and stop 170 moves from locked end 158b of flat 158 to unlocked end 158a, at which point raised portion 155a of detent spring 155 engages unlocked detent depression 168a. As outer sleeve 102 rotates relative to inner sleeve 104, protrusion 150 of sliding lock 148 is urged forwardly from locked end 166b of lock groove 166 toward unlocked end 166a by camming surface 166c, thereby causing sliding lock 148 to move forwardly against the spring force of spring 156. Once lock tooth 154 no longer engages annular array of locking teeth 134, outer sleeve 102, inner sleeve 104 and inner and outer nosepieces 112 and 114 start to rotate as a unit about body 122. As such, jaws 106 are disengaged from the shank of the tool bit, and chuck 100 can be fully opened.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole and in part. Furthermore, those of ordinary skill in the art will appreciate that the foregoing description is by way of example only, and is not intended to limit the invention so further described in such appended claims. Therefore, the spirit and scope of the appended claims should not be limited to the description of the preferred versions contained therein.

What is claimed is:

1. A chuck for use with a manual or powered driver having a rotatable drive shaft, the chuck comprising:
    a generally cylindrical body having a tail section and a center axis, the tail section being configured to rotate with the drive shaft and the body defining an axial bore;
    a plurality of jaws movably disposed with respect to the body;
    a first annular array of locking teeth non-rotatably and axially fixed to the body;
    a lock ring including a second annular array of locking teeth, the lock ring being axially movable with respect to the body, the first locking teeth and the second locking teeth being configured so that when the second locking teeth engage the first locking teeth, the first locking teeth and the second locking teeth prevent the lock ring from rotating in an opening direction with respect to the body;
    a generally cylindrical sleeve rotatably mounted about the body, the sleeve being in operative communication with the jaws so that rotation of the sleeve in a closing direction moves the jaws toward the center axis of the body and rotation of the sleeve in the opening direction moves the jaws away from the center axis of the body, the lock ring being non-rotatably fixed with respect to the sleeve; and
    a camming surface being in operative communication with the lock ring, the camming surface being rotatable with respect to the lock ring between a first rotational position and a second rotational position,
    wherein the second locking teeth are disengaged from the first locking teeth when the camming surface is in the first rotational position and the second locking teeth engage the first locking teeth when the camming surface is in the second rotational position.

2. The chuck of claim 1, wherein the lock ring further comprises at least one tab extending radially outwardly from an outer perimeter thereof.

3. The chuck of claim 2, wherein the sleeve further comprises at least one axially extending slot defined therein, the at least one slot slidably receiving the at least one tab of the lock ring.

4. The chuck of claim 2, wherein the second locking teeth extend axially forward from the lock ring.

5. The chuck of claim 1, wherein the camming surface is in operative communication with the at least one tab of the lock ring.

6. The chuck of claim 1, wherein the camming surface is rotationally fixed to a first ring.

7. The chuck of claim 6, wherein the first ring further comprises a substantially cylindrical outermost sleeve.

8. The chuck of claim 1, further comprising a threaded spindle rotatably connected to the body and in driving engagement with the jaws so that rotation of the threaded spindle in the closing direction moves the jaws toward the center axis and rotation of the threaded spindle in the opening direction moves the jaws away from the center axis.

9. The chuck of claim 8, wherein the threaded spindle is non-rotatably fixed to the sleeve.

10. A chuck for use with a manual or powered driver having a rotatable drive shaft, the chuck comprising:
    a generally cylindrical body having a tail section and a center axis, the tail section being configured to rotate with the drive shaft and the body defining an axial bore;
    a plurality of jaws movably disposed with respect to the body;
    a first plurality of locking teeth non-rotatably and axially fixed to the body;
    a generally cylindrical sleeve rotatably mounted about the body, the sleeve being in operative communication with the jaws so that rotation of the sleeve in a closing direction moves the jaws toward the center axis of the body and rotation of the sleeve in the opening direction moves the jaws away from the center axis of the body;
    a lock ring including a second plurality of locking teeth, the lock ring being axially movable with respect to the body, the first locking teeth and the second locking teeth being configured so that when the second locking teeth engage the first locking teeth, the first locking teeth and the second locking teeth prevent the lock ring from rotating in an opening direction with respect to the body, the lock ring being non-rotatably fixed with respect to the sleeve; and a camming member being in operative communication with the lock ring, the camming member being rotatable with respect to the lock ring between a first rotational position and a second rotational position, wherein the second locking teeth are disengaged from the first locking teeth when the camming surface is in the first rotational position and the second locking teeth engage the first locking teeth when the camming surface is in the second rotational position.

11. The chuck of claim 10, wherein the lock ring further comprises at least one tab extending radially outwardly from an outer perimeter thereof.

12. The chuck of claim 11, wherein the sleeve further comprises at least one axially extending slot defined therein, the at least one slot slidably receiving the at least one tab of the lock ring.

13. The chuck of claim 10, wherein the first plurality of locking teeth further comprises a first annular array of locking teeth.

14. The chuck of claim 11, wherein the second locking teeth extend axially forward from the lock ring.

15. The chuck of claim 14, wherein the camming member further comprises a first ring defining a camming surface.

16. The chuck of claim 15, wherein the camming surface is in operative communication with the at least one tab of the lock ring.

17. The chuck of claim 16, wherein the first ring further comprises a substantially cylindrical outermost sleeve.

18. The chuck of claim 10, further comprising a threaded spindle rotatably connected to the body and in driving engagement with the jaws so that rotation of the threaded spindle in the closing direction moves the jaws toward the center axis and rotation of the threaded spindle in the opening direction moves the jaws away from the center axis.

19. The chuck of claim 18, wherein the threaded spindle is non-rotatably fixed to the sleeve.

\* \* \* \* \*